United States Patent [19]
Ridgley

[11] Patent Number: 5,975,366
[45] Date of Patent: Nov. 2, 1999

[54] MEASURING DISPENSER OF PARTICULATES

[75] Inventor: Brad Ridgley, 6626 Boulevard View #A2, Alexandria, Va. 22307

[73] Assignee: Brad Ridgley, Alexandria, Va.

[21] Appl. No.: 08/996,818

[22] Filed: Dec. 23, 1997

[51] Int. Cl.⁶ ........................................... B67D 5/52
[52] U.S. Cl. ...................... 222/132; 222/196; 222/246; 222/450
[58] Field of Search .................... 222/196, 246, 222/132, 243, 244, 234, 235, 450

[56] References Cited

U.S. PATENT DOCUMENTS

| | | |
|---|---|---|
| 2,779,510 | 1/1957 | Wilson et al. ............................. 22/196 |
| 4,493,556 | 1/1985 | Prew . |
| 4,522,500 | 6/1985 | Hyer . |
| 4,776,489 | 10/1988 | Tarlow et al. . |
| 4,993,593 | 2/1991 | Fabiano et al. ........................... 222/450 |
| 5,381,967 | 1/1995 | King . |
| 5,460,209 | 10/1995 | Jandura et al. . |

*Primary Examiner*—Philippe Derakshani
*Attorney, Agent, or Firm*—Don Rebsch

[57] ABSTRACT

A device for efficient storage, measuring, and dispensing of several powdered and/or particulate materials holds these materials in a side-by-side array of compartments. Each compartment has a storage chamber and a measuring chamber. Dispensing is prompted by gravity and agitation, for orderly flow of each material through its two chambers as their drain gates are selectively opened. Simultaneously with the opening of the gate under either chamber, a dc eccentric motor acts on that chamber to break up any clumps of material that might impede free flow. Each of the two chambers has its own motor. The storage chamber array is structurally separate from the measuring chamber array, so that the two chambers can vibrate separately, further improving free flow.

18 Claims, 2 Drawing Sheets

MEASURING DISPENSER OF PARTICULATES

BACKGROUND

1. Field of the Invention

This invention is an improvement of U.S. Pat. No. 4,776,489, issued in 1988 to Tarlow and Ridgley for an "Automatic Spice and Herb Dispenser", which is hereby incorporated by reference.

2. Description of the Prior Art

Evidently, since the filing of the above 1988 Patent, only one pertinant US Patent has appeared, 5,460,209, a dispenser of baking materials, issued to Jandura et al. Materials are spilled from a storage chamber onto two successive inclined surfaces, as each surface is agitated by a voice coil motor. This is a completely different approach to the problem solved by the present invention, and it does not include a simple measurement capability.

Another U.S. Pat. No. 5,381,967 to King, has a similarity to a feature of the 1988 parent of the present invention, but it is a feature that is eliminated in the present invention. King shows a central agitator (a helical auger) in the output spout of his dispenser. As will be shown below, removal of the central agitator of U.S. Pat. No. 4,776,489 has led to unexpected advantages.

SUMMARY OF THE INVENTION

A dispenser based on the 1988 Patent was produced and marketed by Seasonart Corporation. While it was a definite improvement over any known spice dispenser, it also had problems: (1) the center agitator (reference 70 in the patent) was not completely effective in breaking up clumps of cakey spices, such as ginger, (2) center agitators were difficult to assemble and to clean, and (3) the agitators did not move materials at the walls of the chambers as efficiently as at their centers, but instead, formed pockets of older spices as fresh spices moved through. This latter problem was so serious that ginger would sometimes not dispense at all.

A lengthy analysis of flow led to experiments based on several theories. The best results were obtained with vibration that reached the greatest surface area of the chamber walls. By separating the two chambers structurally, and assigning to each its own vibrator, agitation was distributed more uniformly and efficiently. Previously, energy was wasted in agitating both chambers when only one was dispensing; but, worse than wasting energy, this evidently contributed to the blockages, by packing the chamber that was not being dispensed. It was surprising that removal of the center agitators actually improved flow in the new model, but that was the result. Further improvement was achieved by making the sloping floor of the storage chambers convexly arcuate, rather than flat, so that the slope increased with depth. This evidently counteracts the tendency for packing to occur at greater depth. Thus, the objects of the preceeding invention have been more fully attained by the new invention.

DESCRIPTION OF THE PREFERRED EMBODIMENT

Figure 1:
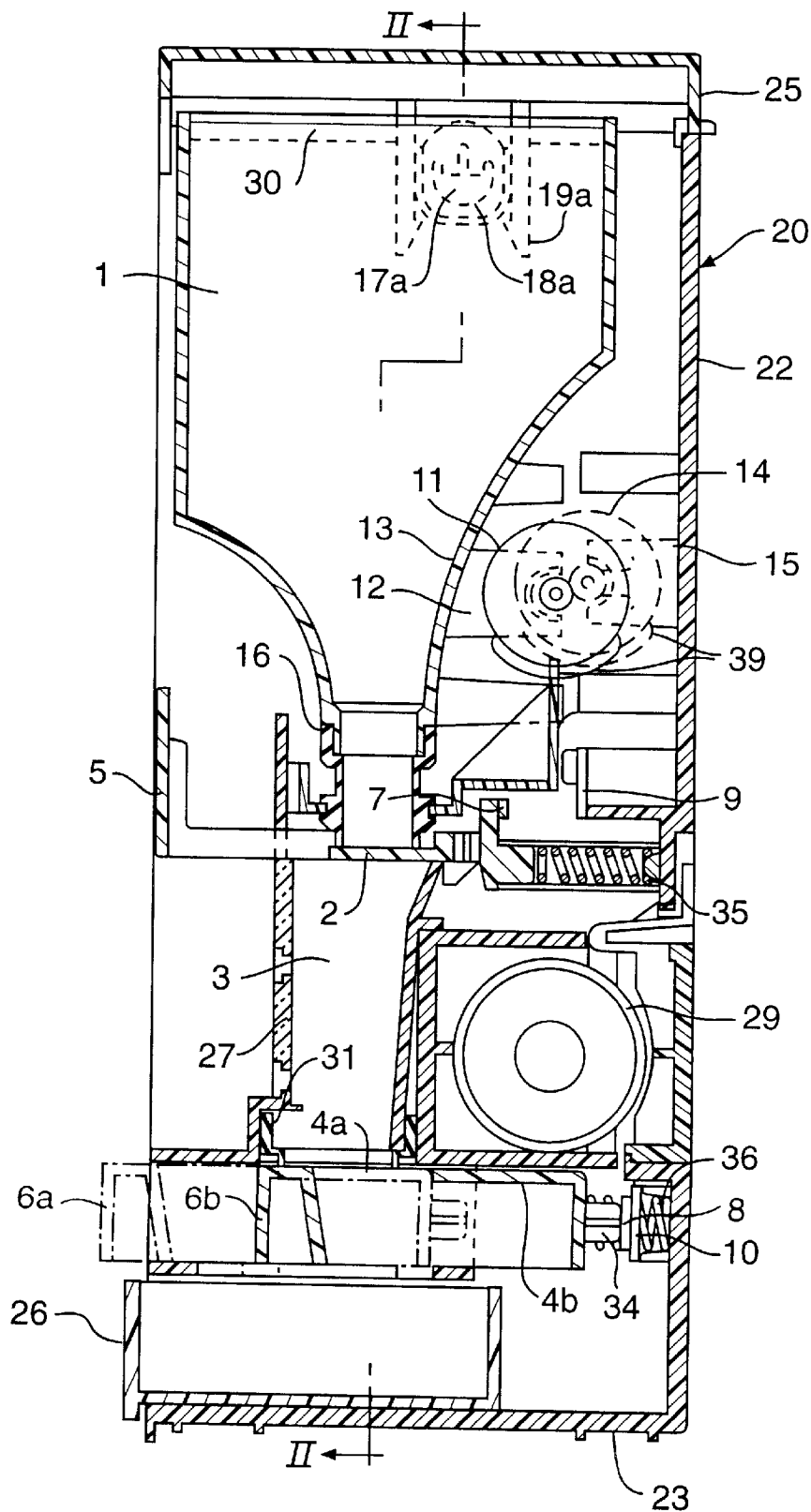
FIG. 1 is a side view of the dispenser taken in cross section through a typical compartment.
Figure 2:
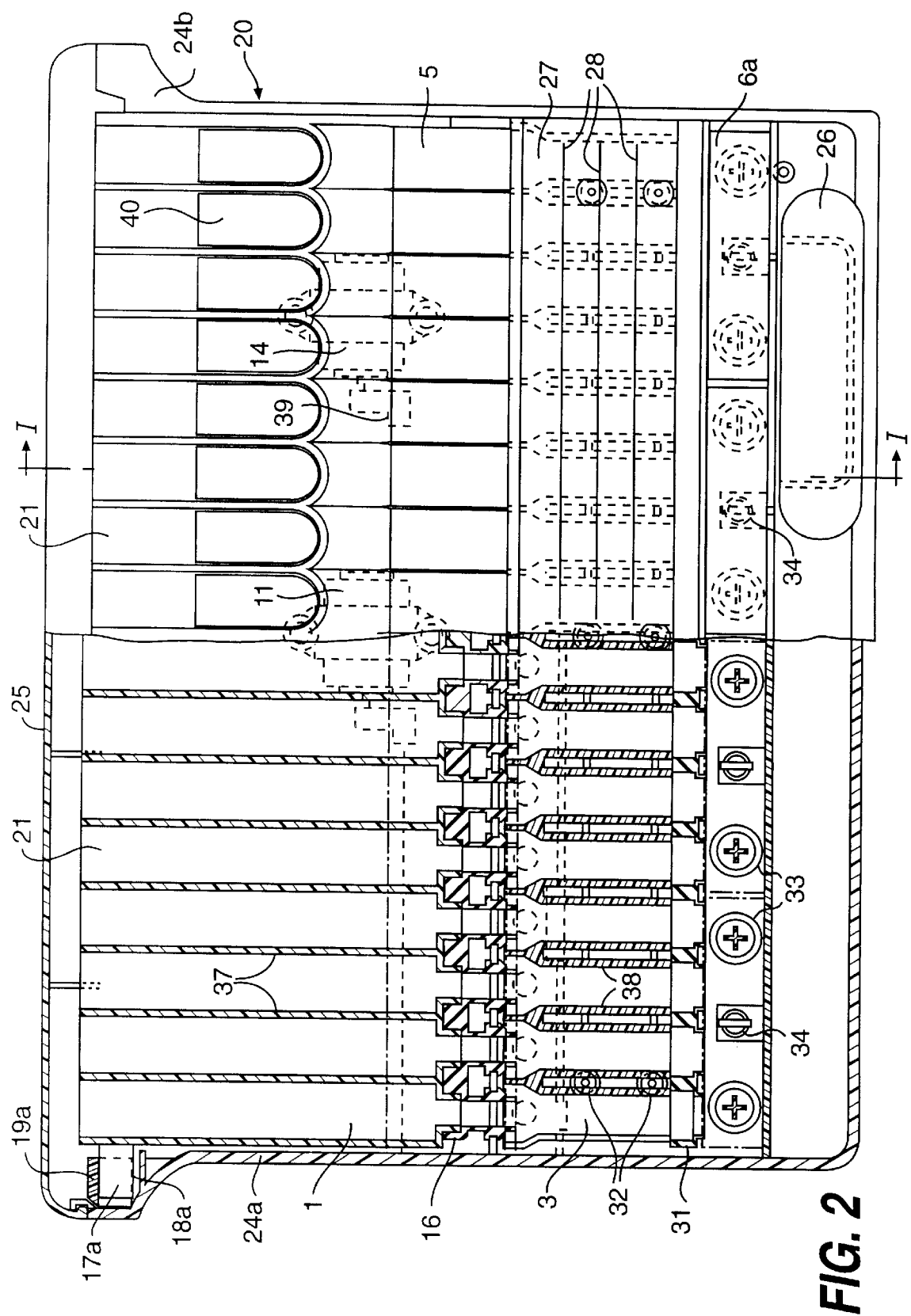
FIG. 2 is a front view with a cutaway cross section taken through the pivot of the storage chambers.

Referring now to FIG. 1 of the drawings, a cross section of dispenser 20 is shown, taken through one of sixteen side-by-side compartments 21 (section I—I in FIG. 2). Back wall 22 and bottom 23 form the main housing of the dispenser, together with side walls 24a,b. This structure can be molded of opaque plastic. Within these walls, the sixteen compartments, and associated components are supported. The compartments can preferably be molded of clear plastic, so that the progress of particulates through them can be easily observed.

Each compartment 21 has a storage chamber 1 and a dispensing chamber 3. Between chambers 1 and 3 is a sliding storage gate 2, that is opened by a rearward push on button 5, to release the desired amount of particulate from storage chamber 1 to measuring chamber 3.

At the bottom of chamber 3 is a corresponding measuring gate 4a, shown in phantom to represent its normally closed position; its open position is shown at 4b, achieved when large button 6 is pushed rearwardly. Button 6 is molded as a unit with this gate and contact support 34. Button 6 is drawn in phantom lines to represent its normal position 6a, and in solid lines to represent its pushed (open) position 6b. This shows the extent of button 6's slide.

Similarly, storage gate 2 is opened by its unitary small button 5. Furthermore, a dual function is performed by pressing either of these buttons 5 and 6. In addition to opening gates 2 or 4a, the rear end of each button holds pieces of metal 7 and 8, respectively. When small button 5 is pushed, metal 7 bridges ground and power contacts of storage motor printed circuit board (PCB) 9 to energize storage motor 11. Thus, storage motor 11 vibrates storage chamber 1 when storage gate 2 is open, assuring that any stored material will be dispensed. Storage motor 11 is attached by its support 12 to the bottom wall 13 of storage chamber 1.

Measuring motor 14 is attached to back wall 22 by support 15, but is shown here in phantom, since it lies forward of the drawing plane. Similarly, when large button 6 is pushed, metal 8 bridges the contacts of measuring PCB 10, to energize measuring motor 14 and assist the dispensing of measuring chamber 3, by the vibration of rotating eccentric 39.

Note that measuring chamber 3 is a structural part of the main housing, and is vibrated by motor 14 attached to back wall 22, whereas storage chamber 1 is isolated from the main housing. The sixteen storage chambers 1 compose a unitary side-by-side array having only three supports, each being non-rigid: resilient storage gasket 16, and pivots 17a,b, supported in the side walls at 24a,b (FIG. 2). This insures that most of the vibratory motion of storage motor 11 is confined to storage chamber 1. Pivots 17a,b are held in journals 18a,b of side walls 24a,b by clips 19a,b. This separation is considered the major breakthrough that enables the success of the new invention. Storage chamber lids 30 are also of resilient material, to insure a tight seal against moisture. Note that storage gasket 16 presses down resiliently on storage gate 2, as does measuring gasket 31 on measuring gate 4a, again to lock out moisture. Cover 30 keeps dust out of housing 20.

Removable tray 26 catches the dispensed contents of measuring chamber 3, after they are measured by viewing their depth in transparent window 27. Battery 29 powers motors 11,14.

FIG. 2, taken at section II—II of FIG. 1, shows sixteen of dispensing compartments 21 in their side-by-side array, as are arranged in front view, the left side cut away to show sections of the storage and measuring chamber separation 37 and 38, respectively. Here it can be seen how the arr of storage chambers 1 is supported by pivots 17a,b and g 16 for independent vibration, and the array of measuring 3 is held rigidly to the housing by mounting screws 32 vibration with the remainder of housing 20.

Small buttons 5 are so-called because they open only one storage gate 2. Large buttons 6 are the width of four chambers, opening four measuring chambers at a time. This adds to the efficiency of operation, as explained below. Near the back corners of large button 6 are two spring anchor projections 33. One of the dual springs 36 that bias each large button forward is shown in FIG. 1, but it is shown behind the electric elements 8,10 associated with contact projection 34, because section I—I is taken at contact projection 34. This coil spring, similar to small button spring 35, is mounted on both of the projections 33 of each large button 6a. Contact projection 34 serves to mount measuring contact 8 that bridges PCB 10 contacts.

Normal operation for producing a required mix of particulates is to push each small button 5 for the length of time required to fill its measuring chamber up to a calibration line 28, signifying the amount needed. Typically, four particulates might be required. After loading the measuring chambers to the desired volume by pressing small buttons 5, the sliding tray 26 is positioned under the loaded measuring chambers 3. Because of its width, up to four chambers can be collected with a single push of only one large button 6.

The invention, therefore, presents a new and highly reliable device for dispensing particulate materials. Extensive testing has not yet produced a single instance of the jamming that plagued the old device. The new device shows several design changes over the old one. Production and use of a machine inevitably point the way to improvements that can not have been foreseen by the original design engineer, but the pivoting storage chambers go significantly beyond an ordinarily expected re-engineering effort.

The biggest engineering challenge in making the storage chambers free to vibrate separately from the remaining structure was in the design of storage gasket 16. It has to permit the rocking movement of the storage array, while maintaining the airtight integrity of chambers 1 and 3. An appreciation of the problem can be seen by inspecting the cross sections of storage gasket 16 in both FIG. 1 and FIG. 2. Notice the thin walls that connect the upper and lower parts of the gasket. These walls are flexible enough to permit a free rocking movement of the storage chambers on pivots 17a,b.

Although this is regarded as the best embodiment of the invention, it is not to be interpreted as showing the full scope of the invention. The scope is to be determined only by the appended claims.

For instance, a voice coil motor (as cited in the claims) is expected to give better agitation of storage chambers 1 than the present dc eccentric motor. The push-pull vector of a voice coil would supposedly agitate chambers 1 on their pivots 17a,b more efficiently than the rotating vector of the dc motor. But practical constraints have not yet permitted a trial of the concept. A larger scale model of the dispenser could be used for baking materials such as flours, sugars, soda, etc.

I claim:

1. A measuring dispenser of particulates, comprising:
   a housing, containing a side-by-side array of compartments, each compartment having a storage chamber positioned above a measuring chamber;
   a first agitator means for vibrating each storage chamber in unison;
   a first dispensing gate between each storage chamber and measuring chamber that allows particulates to fall from said storage chamber into said measuring chamber;
   a second agitator means for vibrating each measuring chamber in unison;
   a second dispensing gate under each measuring chamber that allows said measuring chambers to be emptied; in which each storage chamber is structurally separate from each measuring chamber and from the housing.

2. A dispenser as in claim 1, in which each storage chamber is part of a side-by-side unitary molding, aligned on an upper lateral axis and supported by pivots at both extremities of said axis.

3. The dispenser of claim 2, in which a lower end of the unitary molding is supported by a resilient gasket.

4. The dispenser of claim 3, in which the first and second dispensing gates are slidable, being biased normally closed.

5. The dispenser of claim 1, in which the first agitator means is activated simultaneously with opening of the first gate, and the second agitator means is activated simultaneously with opening of the second gate.

6. The dispenser of claim 5, in which both agitator means are eccentric electric motors.

7. The dispenser of claim 5, in which the storage chamber agitator means is a voice coil motor.

8. A measuring dispenser of particulates, comprising:
   a housing containing a side-by-side array of compartments, each compartment including a storage chamber positioned over an associated measuring chamber,
   the storage chamber having a storage dispensing gate which opens to allow stored particulates to fall into the measuring chamber, the measuring chamber having a measuring dispensing gate which opens to dispense a measurable volume of particulates, the storage chamber being structurally separate from the associated measuring chamber and subject to agitation by a first vibrator,
   and the measuring chamber being structurally attached to the housing and subject to agitation by a second vibrator.

9. The dispenser of claim 8, in which each storage chamber is part of a unitary molding of side-by-side storage chambers, aligned on an upper lateral axis and pivotally supported by pivots at the extremities of this axis, resting in side walls of the housing.

10. The dispenser of claim 9, in which a lower end of the unitary molding is supported by a resilient storage gasket, against which the storage dispensing gate slidingly operates.

11. The dispenser of claim 10, in which both vibrators are eccentric electric motors.

12. The dispenser of claim 10, in which both vibrators are voice coil motors.

13. The dispenser of claim 8, in which the first vibrator agitates the storage chambers simultaneously with opening of the storage gate, and the second vibrator agitates the measuring chamber simultaneously with opening of the measuring gate.

14. A measuring dispenser of particulate materials, comprising: a housing containing a side-by-side array of substantially identical compartments, each compartment including a storage chamber located over a measuring chamber, the chambers being dischargeable by means of a storage gate and a measuring gate, respectively, a storage chamber vibrator that operates simultaneously with the storage gate, and a measuring chamber vibrator that operates simultaneously with the measuring gate.

15. The measuring dispenser of claim 14, in which each storage chamber is part of a unitary molded array of side-by-side chambers.

16. The measuring dispenser of claim 15, in which the side-by-side chambers are aligned on an upper lateral axis, and pivotally supported at each extremity of said axis by side walls of the housing.

17. The measuring dispenser of claim 16, in which a lower end of the side-by-side chambers is supported on a resilient gasket, against which the storage gate slidingly operates.

18. The measuring dispenser of claim 17, in which both vibrators are eccentric motors.

\* \* \* \* \*